US006945783B2

(12) United States Patent
Weissman et al.

(10) Patent No.: US 6,945,783 B2
(45) Date of Patent: Sep. 20, 2005

(54) INTERACTIVE BREAST EXAMINATION TRAINING MODEL

(75) Inventors: Alicia M. Weissman, Iowa City, IA (US); Edwin L. Dove, Swisher, IA (US); Geb Thomas, Iowa City, IA (US); Gregory J. Gerling, Iowa City, IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 251 days.

(21) Appl. No.: 10/152,414

(22) Filed: May 21, 2002

(65) Prior Publication Data

US 2003/0219705 A1 Nov. 27, 2003

(51) Int. Cl.[7] ............................................. G09B 23/28
(52) U.S. Cl. ........................ 434/267; 434/262; 434/273
(58) Field of Search ................................. 434/118, 262, 434/267, 270, 273, 307 R, 308, 362, 365; 378/37, 207; 428/16; 600/438; 623/7, 8

(56) References Cited

U.S. PATENT DOCUMENTS

| | | | |
|---|---|---|---|
| 4,001,951 A | | 1/1977 | Fasse |
| 4,003,141 A | * | 1/1977 | Le Roy ....................... 434/270 |
| 4,134,218 A | | 1/1979 | Adams et al. |
| 4,293,477 A | | 10/1981 | Theodore |
| 4,493,653 A | | 1/1985 | Robbins et al. |
| 4,737,109 A | | 4/1988 | Abramson |
| 4,867,686 A | | 9/1989 | Goldstein |
| 5,199,877 A | * | 4/1993 | Page ........................... 434/262 |
| 5,273,795 A | | 12/1993 | Ullrich |
| 5,599,594 A | | 2/1997 | Pauley |
| 5,658,499 A | | 8/1997 | Steinberg et al. |
| 5,803,746 A | | 9/1998 | Barrie et al. |
| 5,805,665 A | * | 9/1998 | Nelson et al. ............... 378/207 |
| 5,977,489 A | | 11/1999 | Crotzer et al. |
| 6,017,587 A | | 1/2000 | Kleyer et al. |
| 6,068,800 A | | 5/2000 | Singh et al. |
| 6,091,981 A | | 7/2000 | Cundari et al. |
| 6,099,565 A | | 8/2000 | Sakura, Jr. |
| 6,117,539 A | | 9/2000 | Crotzer et al. |
| 6,179,790 B1 | | 1/2001 | Cundari et al. |
| 6,485,308 B1 | * | 11/2002 | Goldstein .................... 434/267 |
| 6,517,354 B1 | * | 2/2003 | Levy ........................... 434/262 |
| 6,575,757 B1 | * | 6/2003 | Leight et al. ............... 434/273 |
| 6,669,483 B1 | * | 12/2003 | Leight et al. ............... 434/262 |
| 6,755,861 B2 | * | 6/2004 | Nakao ............................ 623/8 |
| 2003/0073061 A1 | * | 4/2003 | Toomey ....................... 434/273 |
| 2005/0079475 A1 | * | 4/2005 | Haque .......................... 434/267 |

OTHER PUBLICATIONS

Jacobson, Jim, "UI Model Will Help Doctors, Patients Practice Breast Exams", Iowa Today Aug. 22, 2001.

"Dynamic Simulator for Clinical Breast Examination Training", Masters Thesis of Gregory J. Gerling, University of Iowa, 129 pgs., Dec. 2001 (unpublished).

* cited by examiner

*Primary Examiner*—Joe H. Cheng
(74) *Attorney, Agent, or Firm*—Woodard, Emhardt, Moriarty, McNett & Henry LLP

(57) ABSTRACT

A breast examination training system is used to train physicians and other medical personnel on techniques for clinical breast examinations. The system includes a model having an outer shape comparable to a human breast. Inflatable nodules are embedded at various locations and depths in the model. The nodules are adapted to inflate to simulate tumors and are relatively undetectable by touch when deflated. A valve network fluidly couples the nodules to a pump that inflates the nodules, and a processor is operatively coupled to the valves to actuate the valves to selectively inflate the nodules.

18 Claims, 2 Drawing Sheets

INTERACTIVE BREAST EXAMINATION TRAINING MODEL

BACKGROUND OF THE INVENTION

The present invention generally relates to training models, and more specifically, but not exclusively, concerns an interactive breast examination training model that is able to dynamically change the location, size, and hardness of simulated tumors.

Breast cancer kills approximately 40,000 women yearly in the United States and about 200,000 new cases were diagnosed in 2001. Early detection of breast cancer leads to better and less disfiguring outcomes. For example, data collected over the last several years indicates that if tumors are caught at 2.0 cm, the five-year survival rate exceeds 98%. Methods of detection include mammography, breast self-examination (BSE), and clinical breast examination (CBE). Mammography is an effective tool with limitations of lower sensitivity in younger patients, a high false alarm rate, and low correlation with a decreased mortality rate. BSE is a low-cost detection tool, effective for frequent change monitoring, but not recommended alone. CBE is a practical, low-expense, and highly effective method with proper physician education. CBE is a manual clinical inspection employed for early detection and assessment of breast cancers. Utilizing CBE palpation, physicians search for breast tumors of variable hardness, size, depth, and mobility. Successful tumor localization should be the result of thorough training in tumor characteristic identification and tactile palpation. However, like the sense of touch in general, tumor palpation is not well understood. The tactile sense is often under-trained, leading to low confidence in and under-utilization of CBE. Current training techniques often either prepare a trainee for tumor detection using a static silicone training device or train for high sensitivity without considering specificity. If a physician cannot transfer his training to real breast tissue or differentiate between tumorous and non-tumorous glandular tissue, results will not be acceptably accurate, reproducible, or clinically useful. Currently, detection skills are low among physicians because of a lack of clinical skill training. CBE tumor detection effectiveness can improve through tactile training associated with good teaching. Moreover, evidence suggests that well trained physicians performing CBE could make mammography unnecessary.

There is no standardized CBE practice or training style. Most CBE literature points to the importance of search technique, including use of search pattern, number of fingers, pressures, and finger motions. While search technique can improve overall detection rates, it is possible that consistent, reliable, and verifiable improvement comes from tactile discrimination development. Palpation practice on silicone breast models has been proven to increase the skill level of tumor detection in breast tissue. MAMMACARE brand silicone breast models (Mammatech Corporation, Gainesville, Fla.) attempt to improve tactile skills, with highly recognized models containing static tumors positioned at specified locations. While sensitivity increases in almost all studies involving MAMMACARE brand models, specificity typically decreases, as seen in high numbers of false-positive reports. Also, while the silicone consistency varies, all models contain the same number of tumors in the preset locations. Once tumors are found, the model yields little further training, feedback, or proficiency gains.

Thus, there remains a need for an improved system for simulating breast tumors for CBE training.

SUMMARY OF THE INVENTION

One form of the present invention concerns a unique interactive breast examination training system.

In one form of the present invention, a breast examination training system includes a breast-shaped body portion and a plurality of inflatable nodules embedded in the body portion. The nodules are adapted to inflate to simulate tumors. Pressure sensors are fluidly coupled to the nodules to sense fluid pressure in the nodules. A pump is fluidly coupled to the nodules to inflate the nodules. A processor is operatively coupled to the pressure sensors and the pump. The processor is operable to activate the pump to inflate the nodules to desired hardness levels based upon pressure readings from the pressure sensors.

Another form concerns a unique breast examination training system that includes a model having an outer shape similar to a breast and a plurality of inflatable nodules embedded at various locations in the model. The nodules are adapted to inflate to simulate tumors and are relatively undetectable by touch when deflated in the model. Valves are fluidly coupled to the nodules, and a pump is fluidly coupled to the valves in order to inflate the nodules. A processor is operatively coupled to the valves to actuate the valves to selectively inflate the nodules.

Other forms, embodiments, objects, features, advantages, benefits and aspects of the present invention shall become apparent from the detailed drawings and description contained herein.

DESCRIPTION OF SELECTED EMBODIMENTS

Figure 1:
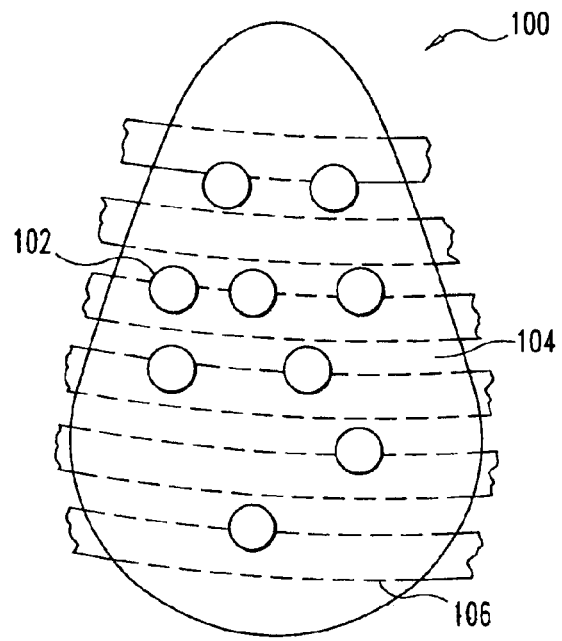
FIG. 1 is a front cross-sectional view of a breast examination model according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. One embodiment of the invention is shown in great detail, although it will be apparent to those skilled in the art that some of the features which are not relevant to the invention may not be shown for the sake of clarity.

The present invention provides dynamic breast examination models that can be used to improve a physician's clinical breast examination performance and increase his or her rate of tumor detection. As compared to breast models with static tumors, models of the present invention can simulate a wide variety of diverse breast/tumor configurations featuring tumors at different locations and in different configurations. Moreover, the breast examination models according to the present invention allow for independent adjustment of tumor hardness.

Figure 2:
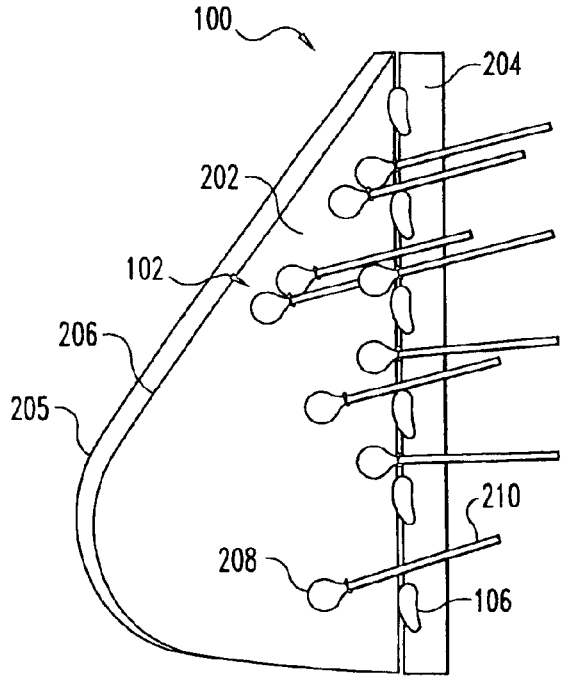
FIG. 2 is a side cross-sectional view of the FIG. 1 breast examination model.

A breast examination model 100 according to one embodiment of the present invention is illustrated in FIGS. 1 and 2. As shown in FIG. 1, the breast model 100 includes a plurality of inflatable nodules 102 that are embedded in a body portion 104 of the model 100. The inflatable nodules 102 are used to simulate tumors or lumps. Each nodule 102 can be inflated to make a detectable lump appear in the model 100 at the location of the nodule 102 or deflated such that no detectable lump is present at that location. Once deflated, the nodules 102 are undetectable when examining the model 100. The nodules 102 can vary in size, hardness, location and fixedness. In one form, the nodules 102 vary in size from about 0.3 cm to about 1.5 cm and can be inflated to a hardness between 20 to 50 durometers. In one embodiment, a breast model in accordance with the present invention includes at least six (6) nodules 102, which has been determined to provide suitable versatility to provide adequate training. In another embodiment, the model 100 has fifteen (15) nodules 102 that can be inflated to different levels of hardness.

The model 100 further incorporates rib members 106, which are used to simulate the ribs of a patient. In the illustrated embodiment, six (6) rib members 106 are included, the rib members having a generally flat shape in order to simulate human ribs. As depicted in FIG. 2, the body portion 104 includes a simulated soft tissue portion 202 that is formed in the shape of a woman's breast and a hard backing portion 204. The rib members 106 can be made, for example, of a rigid plastic material and, in the embodiment shown, are embedded between the soft tissue portion 202 and the backing portion 204. Alternatively, rib members 106 can be integrally formed with backing portion 204, or otherwise attached to the backing portion 204 as would occur to a person of ordinary skill in the art. In one form, soft tissue portion 202 and backing portion 204 are glued together.

Portion 202 simulates the soft glandular tissue of a woman's breast; while the rib members 106 along with the backing portion 204 simulate the rib and inter-rib muscle structures of a woman. The soft tissue portion 202 is preferably made of a soft opaque material that has a hardness comparable to human breast tissue. In one embodiment, portion 202 is made of a silicone matrix material that is fairly homogenous and has little nodularity. In one non-limiting example, the soft tissue portion 202 includes a high strength, tin-based, silicone polymer with 85% cross linker manufactured by BJB Enterprises (Product Number TC-5005). The backing portion 204 is made of a harder material as compared to the soft tissue portion in order to simulate the inter-rib musculature. In one non-limiting example, backing portion 204 includes a translucent, platinum-based, silicone rubber manufactured by BJB Enterprises (Product Number TC-5030). Further illustrated in FIG. 2 is a flexible haptic or touch sensitive array 205 that overlays outer surface 206 of the model 100. The location and pressure applied to the model 100 is sensed with haptic array 205. In one embodiment, the haptic array is a T-2000 model haptic array manufactured by Pressure Profile Systems, Inc.

Figure 3:
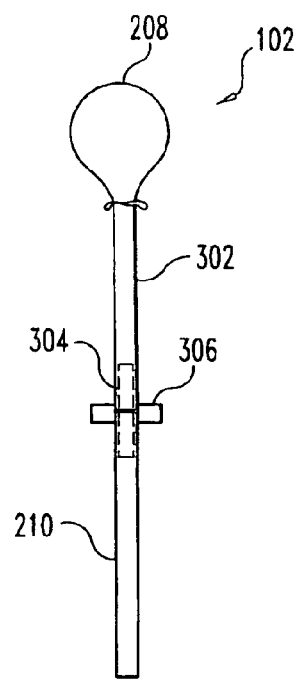
FIG. 3 is a cross sectional view of an inner nodule according to one embodiment of the present invention that can be used in the FIG. 1 breast examination model.

As shown in FIG. 2, the nodules 102 are positioned at varying depths with respect to outer surface 206 of the model. For instance, some nodules 102 can be positioned just underneath the outer surface 206, while others can be positioned between the rib members 106 and/or against the backing portion 204. Each inner nodule 102 includes a balloon portion 208, and a supply tube 210 is attached to the balloon portion 208 in order to supply fluid to the balloon 208. Each supply tube 210 extends from its respective balloon 208 and through the backing portion 204. The interface between the balloon portion 208 and the supply tube 210 in one embodiment is illustrated in detail in FIG. 3. As illustrated, the balloon 208 has a hollow mouth portion 302 to which the supply tube 210 is attached. A rigid support tube 304 is positioned within the end of the supply tube 210 that is received within the mouth portion 302 of the balloon portion 208. A tie 306 is cinched around the mouth 302 of the balloon 208 at the support tube 304 so as to secure the balloon 208 to the supply tube 210. The support tube 304 prevents the tie 306 from collapsing the supply tube 210. In one embodiment, both the balloon 208 and the supply tube 210 are formed of a polyethylene material, and the support tube 304 is formed from a portion of a needle. In one form, the supply tube 210 is a catheter tube. It should be appreciated that the balloon 208 can be attached to the supply tube 210 in other manners as would occur to those skilled in the art.

In one form, water is used to pressurize the nodules 102. As should be appreciated, other types of fluids, alternatively or additionally, can be used to pressurize the nodules 102. It was discovered that the balloons 208, which are used to simulate tumors, have a linear relationship between internal fluid pressure and external hardness. Measurements of water pressure in pounds per square inch (psi) versus nodule hardness (Shore A Durometer) were taken of nodules outside of the body portion 104 of the model 100. Nodules 102 with three differently sized balloons 208 with 0.5 cm, 1.0 cm and 1.5 cm diameters, respectively, were measured. Table 1 below displays the results and the accompanying linear functions that are used to predict nodule hardness based upon water pressure for each differently sized balloon 208. As should be appreciated from Table 1, the functions have high $R^2$ values, which indicate good measurement accuracy, and larger nodules 102 require less pressure in order to reach a higher hardness value.

TABLE 1

Hardness (Durometer Type A) with Variation in Nodule Water Pressure

| PSI | Nodule 1 (0.5 cm diameter) Hardness (durometers) | Nodule 2 (1.0 cm diameter) Hardness (durometers) | Nodule 3 (1.5 cm diameter) Hardness (durometers |
|---|---|---|---|
| 10 | 23 | 26 | 28 |
| 20 | 31 | 32 | 35 |
| 30 | 32 | 36 | 41 |
| Linear Function | y = 0.45x + 19.667 | y = 0.50x + 21.333 | y = 0.65x + 21.667 |
| $R^2$ Value | 0.8322 | 0.9868 | 0.9980 |

Figure 4:
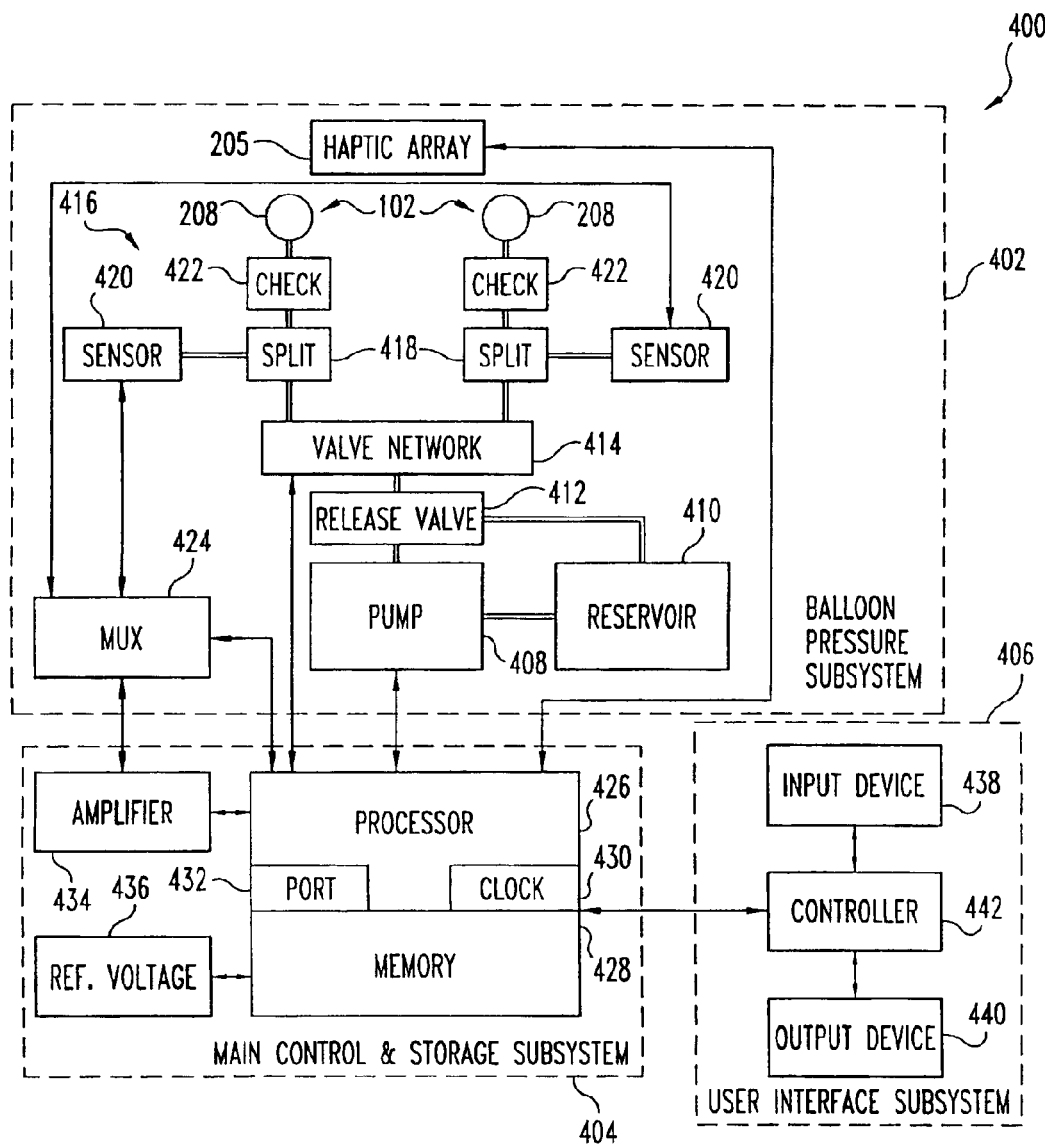
FIG. 4 is a diagrammatic view of a breast examination training control system according to one embodiment of the present invention that operates the FIG. 1 breast examination model.

Since nodule hardness can be determined based on the supply fluid pressure, simulated tumors of variable, known hardness levels can be created in the model 100. A dynamic breast simulation system 400 according to one embodiment of the present invention, which is adapted to control simulated tumor hardness, is illustrated in FIG. 4. The system 400 is operable to selectively inflate the balloons in the model 100 to a desired hardness level. As shown, the system 400 includes a balloon pressure subsystem 402, a main control subsystem 404 and a user interface subsystem 406. The balloon pressure subsystem 402 is used to pressurize and sense the pressure in the nodules 102. The main control subsystem 404 controls the operation of the balloon pressure subsystem 402 and processes sensor information from the balloon pressure subsystem 402. User interface subsystem 406 allows a trainer to interface with the system 400. It should be appreciated that subsystems 404 and 406 can be specially designed components and/or integrated into a general-purpose computer.

As illustrated in FIG. 4, the balloon pressure subsystem 402 includes a pump 408 fluidly coupled to a reservoir 410. The pump 408 pumps the water or other fluid stored in reservoir 410 in order to pressurize selected balloons 208. In the illustrated embodiment, the pump 408 is a nonreversible pump. A release valve 412 is fluidly coupled to both the pump 408 and the reservoir 410 in order to releases water back into the reservoir 410 when the pump 408 is not operating. It should be understood that if a reversible pump 408 is used, the release valve 412 is not needed to drain water back into the reservoir 410. In FIG. 4, a valve network 414 is fluidly coupled to the release valve 412 and is adapted to select which balloon or balloons 208 are pressurized. In one embodiment, valve network 414 is unitary component with a single inlet port and multiple outlet ports. In another embodiment, the valve network 414 is composed of separate electrically actuated valves. For the sake of clarity, only two nodule assemblies 416 are shown to be fluidly coupled to the valve network 414 in FIG. 4. It is understood that more than two nodule assemblies 416 can be fluidly coupled to the valve network 414 in an alternate embodiments. In one embodiment, at least six (6) nodule assemblies 416 are connected to the valve network 414. In another embodiment, fifteen (15) nodule assemblies 416 are connected to the valve network 414.

Each nodule assembly 416 includes a split valve 418, a pressure sensor 420, a pressure relief valve 422, and a nodule 102. The split valve 418 is fluidly coupled to the valve network 414 and splits off part of the fluid flow to pressure sensor 420. Pressure sensor 420 measures the amount of fluid pressure in the nodule 102, and the pressure sensors 420 are each operatively coupled to a multiplexer (MUX) 424. Pressure relief valve 422 is fluidly coupled between the nodule 102 and the split valve 418 in order to relieve fluid pressure if an overpressure condition occurs in the balloon 208. This prevents the balloon 208 from bursting if excessive pressure is applied to the balloon 208. Since differently sized balloons 208 burst at different pressures, each balloon size can use differently rated relief valves 422, which release water at different pressure levels. In one embodiment, the relief valves 422 are check valves. It should be appreciated that the relief valve 422 can include other types of pressure release valves. Further, it should be appreciated that the relief valves 422 can be fluidly coupled to the reservoir 410 for drainage purposes (not shown).

As depicted in FIG. 4, the main control subsystem 404 includes a processor 426, memory 428, a clock 430, a port 432, an amplifier 434, and a reference voltage source 436. The memory 428, the clock 430, the port 432, the amplifier 434, and the reference voltage source 436 are each operatively coupled to the processor 426. In order to receive touch pressure information, the haptic array 205 is operatively coupled to the processor 426. Further, the processor 426 is operatively coupled to the pump 408 in order to control pump operation. In one embodiment, a transistor is operatively coupled to the pump 408 in order to turn the pump 408 on or off, and a diode is operatively coupled to the pump 408 so as to prevent back electromotive force (emf) from the pump 408. As illustrated, the processor 426 is operatively coupled to the valve network 414 in order to select which nodes 102 are pressurized. By being operatively coupled to both the MUX 424 and the amplifier 434, processor 426 is able to selectively receive pressure readings from sensors 420. The processor 426 may be comprised of one or more components. For a multi-component form of processor 426, one or more components may be located remotely relative to the others, or configured as a single unit. Furthermore, processor 426 can be embodied in a form having more than one processing unit, such as a multi-processor configuration, and should be understood to collectively refer to such configurations as well as a single-processor-based arrangement. One or more components of the processor 426 may be of electronic variety defining digital circuitry, analog circuitry, or both. Processor 426 can be of a programmable variety responsive to software instructions, a hardwired state machine, or a combination of these.

Among its many functions, the memory 428 in conjunction with the processor 426 is operable to store pressure data and system status data. Memory 428 can include one or more types of solid state memory, magnetic memory, or optical memory, just to name a few. By way of nonlimiting example, the memory 428 can include solid state electronic random access memory (RAM), sequential access memory (SAM) (such as first-in, first-out (FIFO) variety or last-in, first-out (LIFO) variety), programmable read-only memory (PROM), electronically programmable read only memory (EPROM), or electronically erasable programmable read only memory (EEPROM); an optical disk memory (such as a DVD or CD-ROM); a magnetically encoded hard disk, floppy disk, tape, or cartridge medium; or a combination of these memory types. In addition, the memory 428 may be volatile, non-volatile, or a hybrid combination of volatile and non-volatile varieties, and memory 428 can be in the form of removable memory. Memory 428, when removable, can be in the form of a non-volatile electronic memory unit, optical memory disk (such as a DVD or CD ROM); a magnetically encoded hard disk, floppy disk, tape, or cartridge medium; or a combination of these or other removable memory types. In one embodiment, memory 428 includes a removable flash memory card. In the illustrated embodiment, clock 430 is used to time processor operations and port 432 allows system 400 to communicate with other systems, such as a computer. In one form, port 432 is a RS-232 port.

The processor 426 selects which sensor 420 to read through MUX 424. The amplifier 434 amplifies the sensor reading before the reading is sent to the processor 426 in order to improve reading resolution. In one embodiment, the pressure sensor readings are in the form of voltage, and the amplifier 434 amplifies the sensor reading voltage before it is introduced to an analog to digital (A/D) converter, which is incorporated in the processor 426. The reference voltage source 436 is used to improve reading accuracy during A/D conversion. As should be understood, the sensor readings can come from the sensors 420 in other forms, such as in a digital format. The pressure sensors 420 have two primary functions. First, the pressure sensors 420 are used in controlling balloon hardness during inflation. Second, the pressure sensors 420 monitor the pressure trainees place into nodules 102 during examination. This can be used to provide feedback as to whether the trainee applied adequate pressure on to the simulated tumor.

As mentioned above, the user interface subsystem 406 allows users, such as trainers, to interact with the dynamic training system 400. Subsystem 406 includes an input device 438 and an output device 440, both of which are operatively coupled to interface controller 442. The interface controller 442 is operatively coupled to processor 426 and is used to process user input and/or output. As should be appreciated, in another form of the present invention, controller 442 can be eliminated, and both the input device 438 and the output device 440 can be operatively coupled to the processor 426 through a direct connection. The input device 438 is used to enter information into the system 400, and the output device 440 is used to generate output concerning the system 400. For example, a user with input device 438 can enter into system 400 a particular training scenario, and the output device 440 can echo the command and provide feedback concerning training success along with system status. The input device 438 can include input devices as generally know by those skilled in the art. By way of nonlimiting example, the input device 438 can include a keyboard, mouse, microphone, stylus pen, and/or a camera, to name a few of such devices. The output device 440 can include output devices as generally know by those skilled in the art. For instance, the output device 440 can include, but is not limited to, computer monitors, electronic displays, printers, speakers, and the like. In one embodiment, the input device 438 includes a keypad, and the output device 440 includes a liquid crystal display (LCD).

The following provides a brief general description of the operational features of the dynamic breast examination training system 400. Breast tumor examination training sessions, testing sessions and/or experimental testing sessions can be conducted with the model 100. As compared to static breast tumor models in which the location of the simulated tumors can be known after the first use, the dynamic breast tumor simulation model 100 according to the present invention can create a multitude of different tumor configurations. It was discovered that training with the dynamic training system 400 according to the present invention not only improved the ability to find tumors, but also reduced the number of false positives during breast examinations. Through input device 438, a teacher can select a training scenario for training and testing breast examination skills. For instance, the teacher can enter a code, which instructs the system 400 to inflate only three designated balloons 208 to three specified hardness levels (pressures). Further, the teacher can selectively instruct the system 400 to inflate an individual nodule 102 to a specified hardness. Alternatively or additional, the teacher can program their own training scenarios and specify simulate tumor location and hardness. In another example, a user can designate a random operational mode in which the system 400 inflates nodules 102 at random locations and to random hardness levels. Moreover, system 400 can be programmed to cycle through particular tumor locations for training and testing purposes.

Once a nodule 102 has been designated to be inflated in order to simulate a tumor, the processor 426 activates the pump 408 and opens the valve in the valve network 414 for the designated nodule 102. During inflation, the processor 426 through the MUX 424 monitors the pressure readings from the pressure sensor 402 for the designated nodule 102. As discussed above, due to the linear relationship between pressure and hardness of the balloon 208, the processor 426 can precisely control the hardness of the selected nodule 102 by monitoring fluid pressure through sensor 420. Once the desired hardness has been reached, the processor 426, through valve network 414, shuts off the fluid supply to the nodule 102. If required, additional simulated tumors can be created in a similar fashion.

The haptic array 205 is used to sense where and at what pressure the trainee touches the model 100. During a training/testing session, the processor 426 records in memory 428 the pressure readings from the pressure sensors 420 and the haptic array 205. This information can be later used to determine if the trainee has applied proper pressure to the simulated tumor and/or if the tumor was found during the session. When testing tumor identification, the trainee can enter the location of what they believe to be a tumor with the input device 438. To prevent wild guessing, the processor 426 can cross check the entered location with the pressure applied to the specified nodule 102. If no significant pressure change occurred in the nodule 102, then it can be inferred that the trainee found the location through random guessing. The output device 440 can provide feedback to the trainee, such as whether the trainee was correct in identifying a tumor and/or whether the trainee properly applied pressure to the simulated tumor. The system 400 further allows different examination techniques to be compared to one another through tumor randomization.

After the training/testing session, the results in memory 428 can be analyzed. In one embodiment, the memory 428 is physically moved to a computer so that its contents can be downloaded into the computer for analysis. In one form, a flash memory card is physically moved from the system 400 to a computer. The data in memory 428, in another embodiment, is transferred to a computer via port 432. In a further form, the results are analyzed within the system 400. For example, the output device 440 can display the success rate when testing a trained individual.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A breast examination training system, comprising a breast-shaped body portion;

a plurality of inflatable nodules embedded in said body portion, said nodules being adapted to inflate to simulate tumors;

a plurality of pressure sensors associated with said plurality of said inflatable nodules, said pressure sensors being adapted to sense fluid pressure in said nodules; and at least one pump fluidly coupled to said nodules to inflate said nodules.

2. The system of claim 1, further comprising a plurality of pressure relief valves fluidly coupled to said nodules, wherein said pressure relief valves are adapted to relieve excess pressure in said nodules.

3. The system of claim 1, wherein said body portion includes:

a soft tissue portion having an outer shape comparable to a human breast, said soft tissue portion having softness comparable to human glandular tissue;

a hard backing portion attached to said soft tissue portion;

a plurality of rib members associated with said backing portion and in contact with said soft tissue portion, wherein said rib members and said backing portion simulate human ribs and inter-musculature between the human ribs; and wherein said nodules are embedded at varying depths and locations in said soft tissue portion.

4. The system of claim 3, further comprising a processor operatively coupled to said pressure sensors and said pump, said processor being operable to activate said pump to inflate said nodules to desired hardness levels based upon pressure reading from said pressure sensors;

a valve network fluidly coupled to said nodules, said valve network being operatively coupled to said processor to selectively inflate said nodules;

a plurality of pressure relief valves associated with said plurality of said inflatable nodules, wherein said pressure relief valves are adapted to relieve excess pressure in said nodules;

a haptic array overlaying said body portion to sense pressure applied to said body portion, said haptic array being operatively coupled to said processor;

memory operatively coupled to said processor, wherein said processor is operable to store in said memory pressure readings from said pressure sensors corresponding to contact force against said nodules;

an output device operatively coupled to said processor for reporting training results; and an input device operatively coupled to said processor for receiving commands to selectively inflate said nodules.

5. The system of claim 1, further comprising a processor operatively coupled to said pressure sensors and said pump, said processor being operable to activate said pump to inflate said nodules to desired hardness levels based upon pressure readings from said pressure sensors.

6. The system of claim 5, further comprising a valve network fluidly coupled to said nodules, said valve network being operatively coupled to said processor to selectively inflate said nodules.

7. The system of claim 5, further comprising a haptic array overlaying said body portion to sense external pressure applied to said body portion, said haptic array being operatively coupled to said processor.

8. The system of claim 5, further comprising:

memory operatively coupled to said processor; and wherein said processor is operable to store in said memory pressure readings from said pressure sensors corresponding to contact force against said nodules.

9. The system of claim 5, further comprising:

an output device operatively coupled to said processor for reporting training results; and an input device operatively coupled to said processor for receiving commands to selectively inflate said nodules.

10. A breast examination training system, comprising a model having an outer shape similar to a breast;

a plurality of inflatable nodules embedded at various locations in said model, said nodules being adapted to inflate to simulate tumors, said nodules being relatively undetectable by touch when deflated in said model;

a plurality of valves associated said plurality of said inflatable nodules; and at least one pump fluidly coupled to said valves to inflate said nodules.

11. The system of claim 10, further comprising a plurality of pressure relief valves fluidly coupled to said nodules for reducing pressure in said nodules when over pressurized.

12. The system of claim 10, wherein said model includes:

a soft tissue portion having softness comparable to human glandular tissue;

a backing portion attached to said soft tissue portion; and a plurality of rib members associated with said backing portion and in contact with said soft tissue portion, wherein said rib members and said backing portion simulate human ribs and inter-musculature between the human ribs.

13. The system of claim 10, wherein said plurality of said nodules includes at least six nodules.

14. The system of claim 10, further comprising a processor operatively coupled to said valves to actuate said valves to selectively inflate said nodules.

15. The system of claim 14, further comprising:

a plurality of pressure sensors fluidly coupled to each of said nodules, said pressure sensors being adapted to sense fluid pressure in said nodules; and wherein said pressure sensors and said pump are operatively coupled to said processor, said processor being operable to activate said pump to inflate said nodules to different hardness levels based upon pressure readings from said pressure sensors.

16. The system of claim 15, further comprising:

memory operatively coupled to said processor; and wherein said processor is operable to store in said memory pressure readings from said pressure sensors corresponding to force exerted against said nodules during examination.

17. The system of claim 16, further comprising a haptic array operatively coupled to said processor to sense touching pressure against said model; and wherein said processor is operable to store in said memory readings from said haptic array.

18. The system of claim 14, further comprising an input device operatively coupled to said processor for receiving commands to selectively inflate said nodules.

* * * * *

UNITED STATES PATENT AND TRADEMARK OFFICE
CERTIFICATE OF CORRECTION

PATENT NO. : 6,945,783 B2
DATED : September 20, 2005
INVENTOR(S) : Weissman et al.

It is certified that error appears in the above-identified patent and that said Letters Patent is hereby corrected as shown below:

Column 9,
Line 42, change "corresponding to contact force against said nodules." to
-- corresponding to contact force against said nodules during examination. --.

Signed and Sealed this

Thirty-first Day of January, 2006

JON W. DUDAS
*Director of the United States Patent and Trademark Office*